Figure 1:
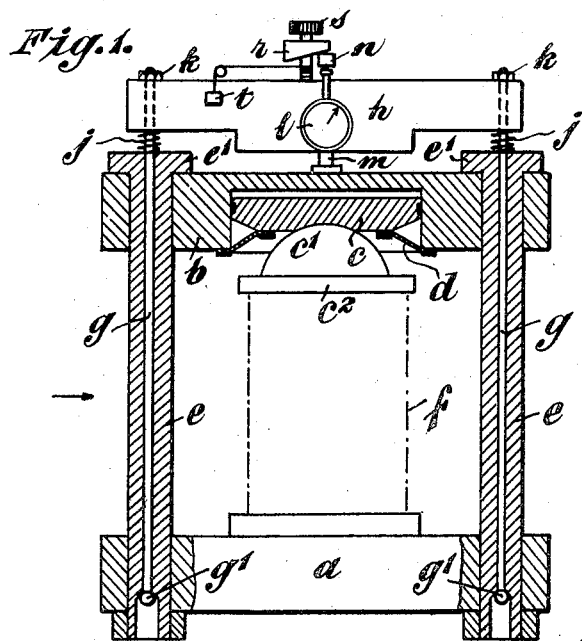

Dec. 16, 1958   A. LENTON   2,864,253
MEANS FOR TESTING THE PHYSICAL PROPERTIES OF MATERIALS
Filed April 28, 1955

INVENTOR
Albert Lenton
By Morris & Bateman
ATTORNEYS

United States Patent Office 2,864,253
Patented Dec. 16, 1958

2,864,253

MEANS FOR TESTING THE PHYSICAL PROPERTIES OF MATERIALS

Albert Lenton, Leeds, England, assignor to Saml. Dennison & Son Limited, Leeds, England, a British company Application April 28, 1955, Serial No. 504,554

7 Claims. (Cl. 73—94)

This invention has reference to improved means for testing the physical properties of materials, and has particular reference to means for measuring the straining force applied to the specimen comprising a testing machine for said application which dispenses with the usual resistant in the form of say a lever, springs, or a hydraulic resistant, whereby the machine is simplified in design.

The invention consists of an improved means for testing the physical properties of materials, characterised by a pressure applying source and a crosshead and a surrounding frame or series of columns or rods through which stresses applied to the specimen are communicated by the crosshead, the crosshead being connected directly or indirectly to a load indicator or recorder.

The accompanying drawings illustrate one means of carrying the present invention into practice as applied to a compression testing machine.

Figure 2:
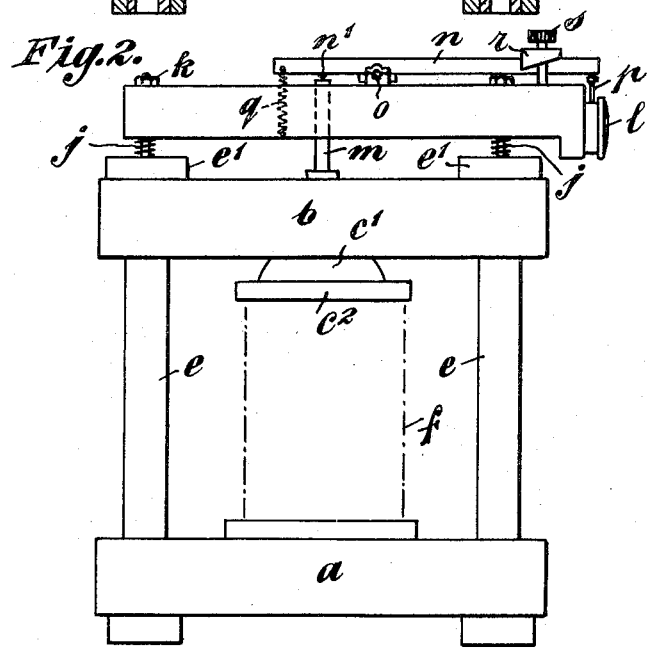

In the drawings:

Fig. 1 is a part sectional front elevation of the selected embodiment of the invention, and Fig. 2 is a side elevation of the apparatus seen in Fig. 1 looking in the direction of the arrow.

The illustrated machine comprises a base $a$ and a crosshead $b$. The crosshead slidably accommodates a hydraulic ram $c$ which ram embodies a spherical seating $c^1$ and a pressure plate $c^2$. Attached to the underside of the ram $c$ and the underside of the crosshead $b$ is an annular flexible diaphragm $d$ which serves to seal the hydraulic connection between the crosshead and the ram. The crosshead is mounted on the said base by means of four columns $e$ which serve to form an open cage or frame surrounding the specimen $f$ which is located between the pressure plate $c^2$ and the base $a$. It will be appreciated that the stress applied to the crosshead through the medium of the hydraulic ram tends to raise the crosshead and thereby to extend or tension the surrounding series or columns $e$ which form the resistance to the loading of the specimen effected by the ram.

Axially located within each of the columns $e$ is a rod $g$ which is provided at its lower end with a spheroidal seating $g^1$ within the base of the column, the upper end of the rod extending through and being anchored by nuts $k$ to a yoke $h$, coiled springs $j$ desirably being interposed between the underside of the yoke and the head $e^1$ of each column, the springs being adapted to urge the yoke and the rods $g$ upwards.

The degree of loading of the specimen is indicated directly and indirectly on a dial $l$ mounted on the front face of the yoke $h$, means being incorporated to admit of a magnification of the load so that a clear indication is effected on the dial. In the illustrated embodiment the force applied to the crosshead is communicated to the dial indirectly through the vertical post $m$ secured to the upper face of the crosshead, the upper end of the post $m$ having connection through a knife edge $n^1$ to a lever $n$ fulcrumed on the bracket $o$ mounted on the yoke $h$, the forward end of the lever $n$ being connected to the mechanism of the dial indicator $l$ through the plunger $p$. When the stresses are relieved the lever $n$ is returned to its normal position by means of the light coiled tension spring $q$ which is anchored at one end of the lever $n$ and at the other end to the yoke $h$.

A means of maintaining the stressed position of the indicator is illustrated in the drawings by the rotatable cam $r$ mounted on the knurled headed screw $s$ which engages with the yoke $h$, the underface of the cam $r$ being automatically maintained in contact with the top face of the lever $n$ under the action of the counterweight $t$, but other means of maintaining the indicator at the stressed position may be employed, the cam being returned to its normal or zero position by a manual rotation of the knurled headed screw $s$.

From the foregoing description it will be appreciated that the indication of the force exerted on the specimen is achieved through the elastic deformation of the columns $e$, the indication being effected through the agency of the rods $g$ and yoke $h$ and lever $n$.

It is further to be appreciated that many different forms or arrangements of the straining frame which in the present instance comprises the four columns $e$ may be adapted according to the design and purpose of the testing machine, and that the measurement will be effected through a mid-point connection on the crosshead $b$, i. e. the combined strain may be integrated through the rods $g$ and yoke $h$ in the several columns $e$, the columns surrounding the specimen in such a way as to ensure a relative proportional application of the load through each of the columns so as to ensure an accurate transmission of the total strain to the indicator.

Graduations or calibrations of the indicator are in units of force which within given limits provide an indication of the true deformation of the straining frame which is proportionate to the load.

I claim:

1. Apparatus for testing the physical properties of materials, comprising a base, a crosshead and a plurality of elastic columns connecting the base and crosshead and forming a frame to receive a specimen, a load applying member interposed between the crosshead and base and mounted for relative movement with respect to said crosshead and adapted to engage and apply stress to a specimen between it and the base and to apply the reaction of such stress to the crosshead and produce a resultant strain on the columns and displacement of the crosshead relative to said base, and a strain mechanism operatively connected to said crosshead so as to be responsive to said displacement of the crosshead.

2. Apparatus as defined in claim 1, wherein said strain mechanism comprises rods which extend between the base and crosshead so as to be movable relatively to said columns, and an indicator device connected to said rods by a system of levers.

3. Apparatus as defined in claim 1, wherein said columns are hollow, and said strain mechanism comprises rods which extend from the base freely through said hollow columns and provide a relatively fixed support for said strain mechanism.

4. Apparatus as defined in claim 1, wherein said load applying member comprises a hydraulic ram and said columns are hollow and arranged in spaced relation around the axis of said ram, and said strain mechanism comprises a yoke on which an indicator device and operating means therefor are mounted, and rods which extend from the base axially freely through said columns and secured to said yoke at points in alinement with said columns, and wherein said strain mechanism is operatively connected to be responsive to displacement of the midpoint of said crosshead.

5. Apparatus as defined in claim 4 wherein said operating means includes a lever pivotally mounted on said yoke and operatively connected to said indicator device.

6. Apparatus for testing the physical properties of materials comprising a frame consisting essentially of a plurality of elastic columns connected at opposite ends to a base and a cross member respectively, a load applying member movably mounted on said cross member and adapted to apply stress to a specimen interposed between it and said base, said cross member being displaced away from said base when the specimen is so placed under stress, means for exerting force on said load applying member to stress said specimen, and means responsive to said stress comprising a yoke, a plurality of rods connected at opposite ends to said yoke and said base, a lever pivoted on said yoke, means operatively connecting one end of said lever to the cross member, and an indicator device operatively connected to the other end of said lever.

7. In the apparatus defined in claim 6, said rods being slidably mounted on said frame and biasing springs for said rods interposed between the frame and said yoke.

References Cited in the file of this patent

UNITED STATES PATENTS

| | | |
|---|---|---|
| 2,075,968 | Von Heydekampf | Apr. 6, 1937 |
| 2,303,621 | Donnelly et al. | Dec. 1, 1942 |

FOREIGN PATENTS

| | | |
|---|---|---|
| 1,026,839 | France | Feb. 11, 1953 |
| 690,204 | Great Britain | Apr. 15, 1953 |

UNITED STATES PATENT OFFICE

CERTIFICATE OF CORRECTION

Patent No. 2,864,253 December 16, 1958

Albert Lenton

It is hereby certified that error appears in the above numbered patent requiring correction and that the said Letters Patent should read as corrected below.

In the grant, lines 2 and 12, and in the heading to the printed specification, lines 4 and 5, name of assignee, for "Saml. Dennison & Son Limited", each occurrence, read -- Saml. Denison & Son Limited --.

Signed and sealed this 21st day of April 1959.

(SEAL)
Attest:

KARL H. AXLINE

Attesting Officer

ROBERT C. WATSC

Commissioner of Paten